Figure 1:
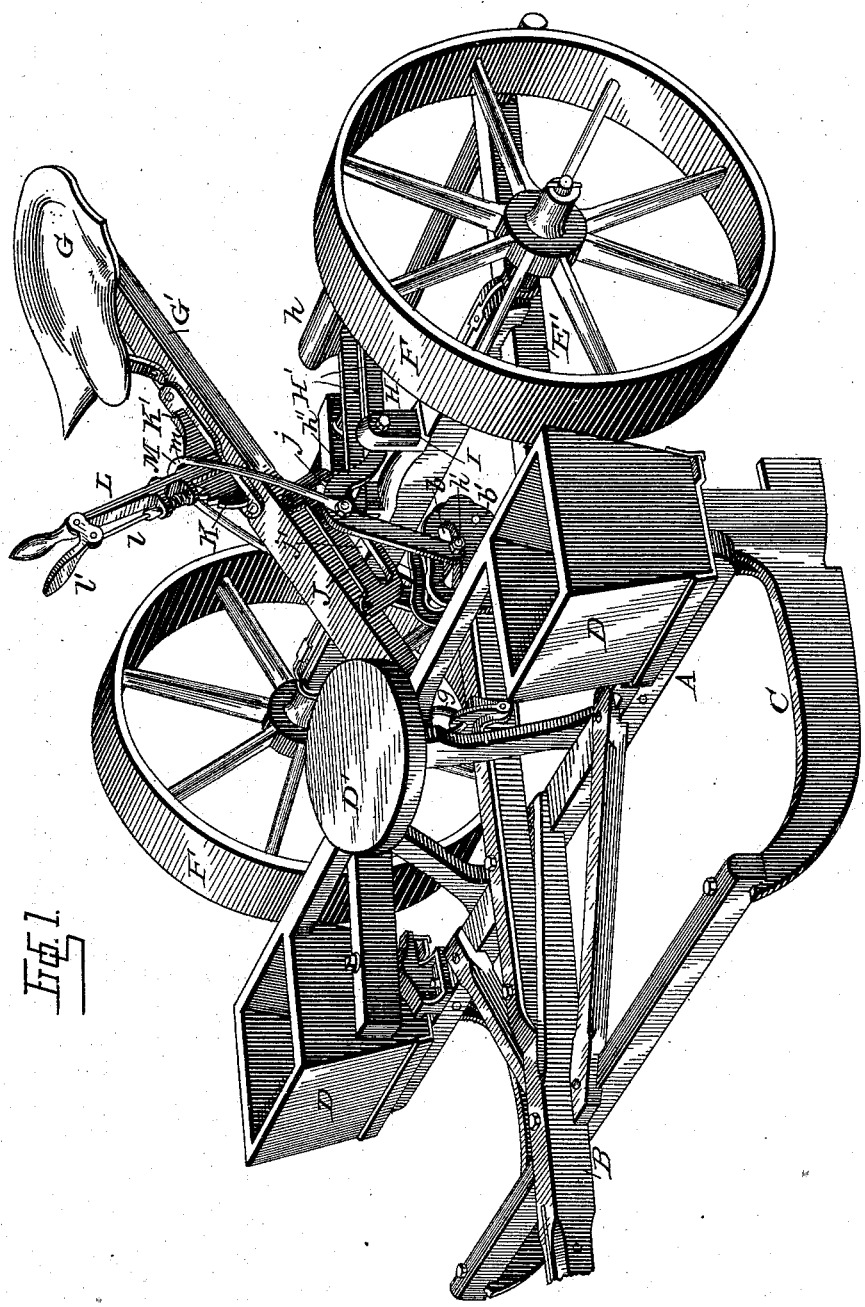

(Model.)

2 Sheets—Sheet 1.

G. W. BROWN.
CORN PLANTER.

No. 278,499.  Patented May 29, 1883.

WITNESSES:
Fred. G. Dieterich.
Jno. G. Hinkel

INVENTOR.
Geo. W. Brown,
By W. P. Richards
ATTORNEY.

N. PETERS. Photo-Lithographer, Washington, D. C.

(Model.)
2 Sheets—Sheet 2.
G. W. BROWN.
CORN PLANTER.
No. 278,499. Patented May 29, 1883.
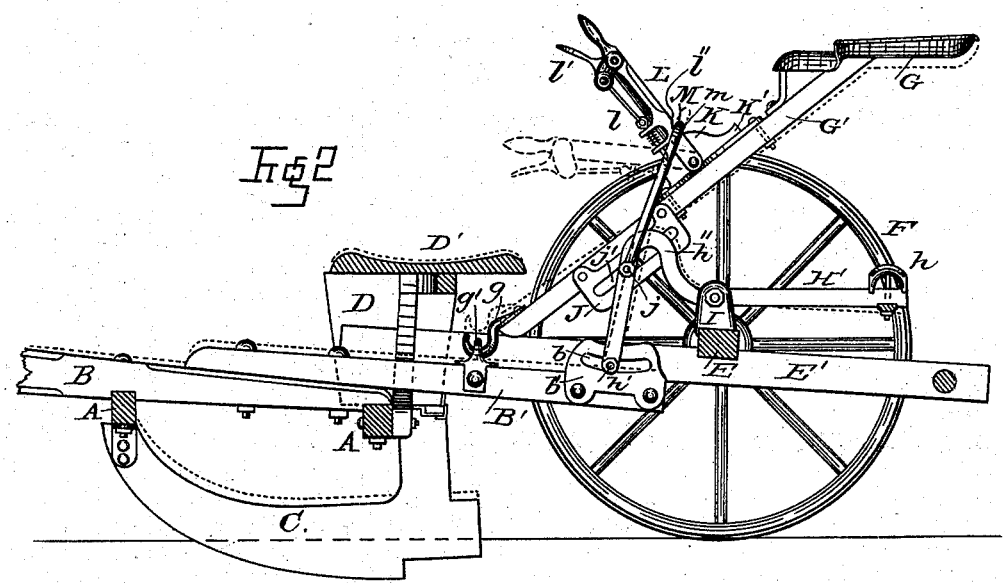
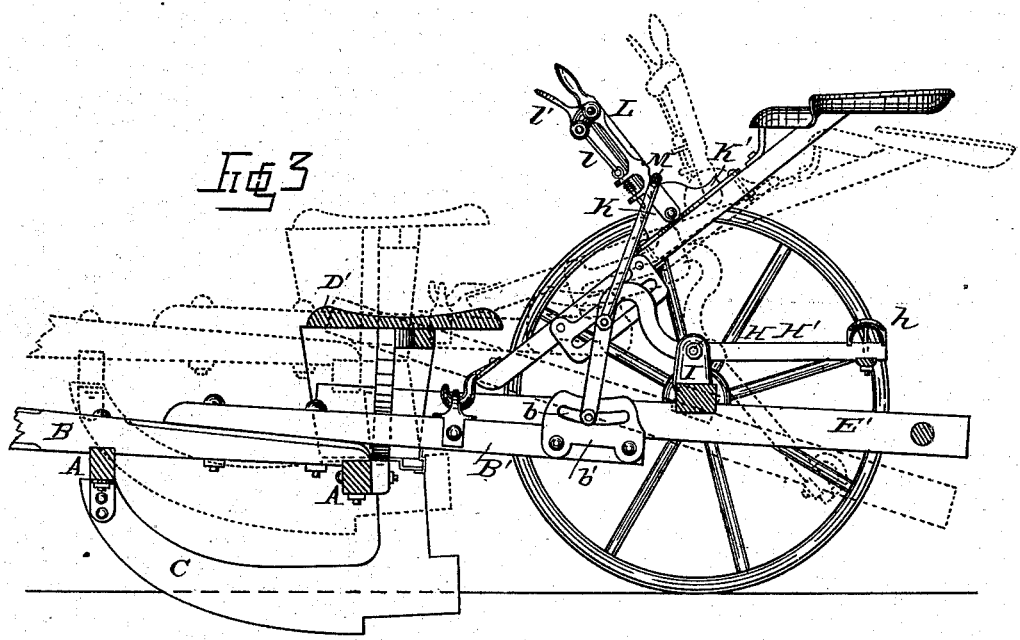
Witnesses
Fred G. Dieterich
Jno G Hinkel
Inventor
Geo. W. Brown,
By W. D. Richards,
his Attorney

UNITED STATES PATENT OFFICE.

GEORGE W. BROWN, OF GALESBURG, ILLINOIS.

CORN-PLANTER.

SPECIFICATION forming part of Letters Patent No. 278,499, dated May 29, 1883.

Application filed January 24, 1883. (Model.)

*To all whom it may concern:*

Be it known that I, GEORGE W. BROWN, a citizen of the United States, residing at Galesburg, in the county of Knox and State of Illinois, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in corn-planters of that class in which a rear main frame supported on wheels is hinged to and combined with a forward frame supported mainly on the furrow openers or runners, and carrying the seed measuring and discharging devices, and in which a lever is journaled to the rear frame and adapted for use to raise and lower the forward frame; and the main feature of my present invention consists in a driver's seat supporting bar hinged at its forward end to the front frame of the planter, and hinged or journaled to and mainly supported by the lever, which is journaled to the rear frame and adapted to raise and lower the forward frame of the planter.

The invention further consists in the combination, with the lever hinged to the rear frame and adapted to raise and lower the front frame of the planter, and with the driver's seat supporting bar supported mainly by said lever, to which it is hinged or journaled, of a stirrup hinged to said lever and adapted to engage with a locking-lever which is hinged to said seat-supporting bar, whereby the depth of planting the seed may be regulated.

The invention further consists in constructions and combinations hereinafter described, and set forth in the claims hereto annexed.

In the accompanying drawings, which illustrate my invention, and in which the similar letters used as marks of reference apply to like parts in all of the figures, Figure 1 is a perspective. Fig. 2 is a sectional elevation lengthwise of the planter. Fig. 3 is same section as Fig. 2.

The parts of the general machine in which my improvements are incorporated, briefly described, as shown, are as follows:

A is the front frame, with tongue B, having rear extension, B', runners C, seed-boxes D, and attendant's seat D'.

E is the rear frame, supported on wheels F, and its side frame-bars, E', hinged at their front ends to the frame, A.

G is the driver's seat, supported on a bar, G', which has a hinge-connection at its front end, by a hook, $g$, with an eye, $g'$, which is fixed to the forward frame A.

H is a lever, formed of two bars, H', pivotally connected near their mid-length portions to the standards I, which project from the rear frame of the planter. The rear ends of the lever H carry a foot-plate, $h$, and its forward end carries a rod or bar, $h'$, which is movably seated in a slot, $b$, in a plate, $b'$, which is fixed to the rear projection, B', of the tongue.

The general machine may be constructed in the ordinary manner I have shown and described, or it may be constructed in any other ordinary manner, as its construction forms no part of my present invention, except as hereinafter described and claimed.

The construction and relative arrangement of the parts of the improvement with reference to each other and with reference to the general machine are as follows: The forward ends of the lever-bars H', from points near the standards I, are bent or curved and extended upward and forward to a recurve or bend, $h''$, from which they extend downward and forward to their ends, which carry the bar $b'$. Near the curve $h''$ the lever-bars H' are connected by a through-bolt or pivot-bolt, $j$, which pivot-bolt also passes through slots $j'$ in plates J, which are secured to the seat-supporting bar G'. The lever-bars H', projecting as they do at their curved portions $h''$, upwardly—one on the outer side of each plate J—thereby sustain the seat-bar G' against lateral movement, while the pivot-bolt $j$ forms the movable connection between said seat-bar and the lever H, by which the driver's seat and the seat-bar are mainly supported, as hereinafter described.

K is a segment rack-bar secured to the upper side of the seat-bar G'.

L is a hand-lever, pivotally connected at its lower end to the rack-bar K, and is provided with an ordinary spring-pawl, $l$, adapted to engage with the teeth in the rack-bar K, and to be operated, as usual, by a bell-crank lever, $l'$.

K' is a shoulder or catch located in rear of the rack-bar K, and may be formed of part of said rack-bar, as shown, or be made separate therefrom.

M is a stirrup, the ends of which are pivotally connected, respectively, to the outer ends of the through-bolt $j$, and the bent portion $m$ passes in rear of or embraces the lever L, which lever L preferably has a transverse groove, $l''$, in its rear side, in which the bent portion of the stirrup may rest when in contact with the lever.

When the lever L is adjusted and fixed, as shown by full lines at Figs. 2 and 3, the stirrup M and front end of lever H will sustain the front frame from penetrating the soil beyond a given depth, and thereby regulate the depth of planting the seed, and while the parts are in said relative positions, should the runners C come in contact with any hard substance—such as sod, clods, old cornstalks, or other material—that they could not cut through readily, the front frame will thereby be raised, and the stirrup M thereby be lifted free of the lever L, as shown by dotted lines at Fig. 2, in which position it will permit the weight of the driver, through the bolt $j$ and forward ends of lever H, to be thrown on the forward frame and runners, and thereby aid the runners in cutting through such hard substances, where it is possible, and thus secure greater uniformity in the depth of planting the seed. By adjusting the lever L in different positions by means of the spring-pawl $l$ being engaged with different teeth in the rack-bar K, the machine may be made to plant at different depths, and when so adjusted to plant at any given depth the frames A and E are rigidly locked together against downward flexure of the joints which unite them, but are free to permit upward flexure of said joints by the stirrup M raising off the lever L and by raising against the weight of the driver, as hereinbefore described.

In planting in sod or very hard ground, or in going up hill, the lever L may be thrown forward to leave the stirrup M entirely free from said lever, as shown by broken lines at Fig. 2, and thereby throw the weight of the driver on the forward frame. By placing his feet on the rear end of the lever H and pressing it downwardly the driver may elevate the front frame and runners C entirely above the ground, and when so elevated the bent part of the stirrup M will engage with the catch K', as shown by dotted lines at Fig. 3, and retain the forward frame so elevated for turning around for local transportation or for any desired purpose.

In the different operations of the devices as hereinbefore described, the rod $h'$ will slide back and forth in the slot $b$, and the rod or bolt $j$ slide back and forth in the slots $j'$, in the evident manner.

The construction of the different parts of my improvement may vary in many features from what I have shown, and their arrangement may vary in many respects and still retain the substance of my improvements; hence I do not limit my claims to the specific construction of these parts, nor to the special arrangement of them shown; but

What I claim as new, and desire to secure by Letters Patent, is—

1. In combination with the front and rear frames of a corn-planter, hinged to each other, and a lever adapted to raise and lower the forward frame, the driver's seat supporting bar, hinged to the forward frame of the planter and supported by said lever, substantially as and for the purpose specified.

2. In combination with the front and rear frames of a corn-planter, hinged together, and a lever hinged to the rear frame and adapted to raise and lower the forward frame, a driver's seat supporting bar hinged to the forward frame and pivotally connected to and supported by said lever, substantially as and for the purpose specified.

3. In combination with the front and rear frames of a corn-planter, hinged together, and a lever hinged to the rear frame and adapted to raise and lower the front frame, a driver's seat supporting bar, hinged to the forward frame and connected to said lever, which supports it by a sliding pivotal connection, substantially as and for the purpose specified.

4. In combination with the front and rear frames of a corn-planter, hinged together, and a lever hinged to the rear frame and adapted to raise and lower the forward frame, a driver's seat supporting bar having slotted plates J, which receive a through-bolt, $j$, carried by said lever, substantially as and for the purpose specified.

5. In combination with the front and rear frames of a corn-planter, hinged together, and a driver's seat supporting bar, hinged at its front end to the forward frame, a lever hinged to the rear frame and bent or curved upwardly to sustain a bolt, $j$, which supports said driver's seat supporting bar, and thence bent downwardly to sustain a bolt, $h'$, by which it is pivotally connected to the forward frame, substantially as and for the purpose specified.

6. In combination with the front and rear frames of a corn-planter, hinged together, a lever hinged to the rear frame and adapted to raise and lower the forward frame, and a driver's seat supporting bar hinged to the front frame and supported by said lever, a stirrup pivotally connected with said lever and adapted for engagement with a locking-lever, whereby it may be held to adjust the depth of planting the seed, substantially as and for the purpose specified.

7. In combination with the front and rear frames of a corn-planter, hinged together, a lever hinged to the rear frame and adapted to raise and lower the forward frame, and a driver's seat supporting bar hinged to the front frame and supported by said lever, and provided with a catch, K', a stirrup pivotally connected with said lever and adapted to engage with said catch, substantially as and for the purpose specified.

8. In combination with the front and rear frames of a corn-planter, hinged together, and a driver's seat supporting bar hinged to the forward frame, a lever, H, adapted to support the driver's seat supporting bar, and formed of bars H' H', adapted to sustain said seat-supporting bar laterally, substantially as and for the purpose specified.

9. The combintion, with the frames A and E and driver's seat supporting bar G', of the lever H, hinged to the rear frame, to the bar G', and to the forward frame, substantially as and for the purpose specified.

10. The combination, with the frames A and E, driver's seat supporting bar G', and the lever H, hinged to the rear frame, to the bar G', and to the forward frame, of the stirrup M, lever L, and rack-bar K, substantially as and for the purpose specified.

11. The combination, with the frames A and E, driver's seat supporting bar G', and the lever H, hinged to the rear frame, to the bar G', and to the forward frame, of the stirrup M and locking-lever L, substantially as and for the purpose specified.

12. The combination, with the frames A and E, driver's seat supporting bar G', and the lever H, hinged to the rear frame, to the bar G', and to the forward frame, of the stirrup M and catch K', substantially as and for the purpose specified.

In testimony whereof I affix my signature in presence of two witnesses.

GEORGE W. BROWN.

Witnesses:
M. J. DOUGHERTY,
I. S. PERKINS.